UNITED STATES PATENT OFFICE.

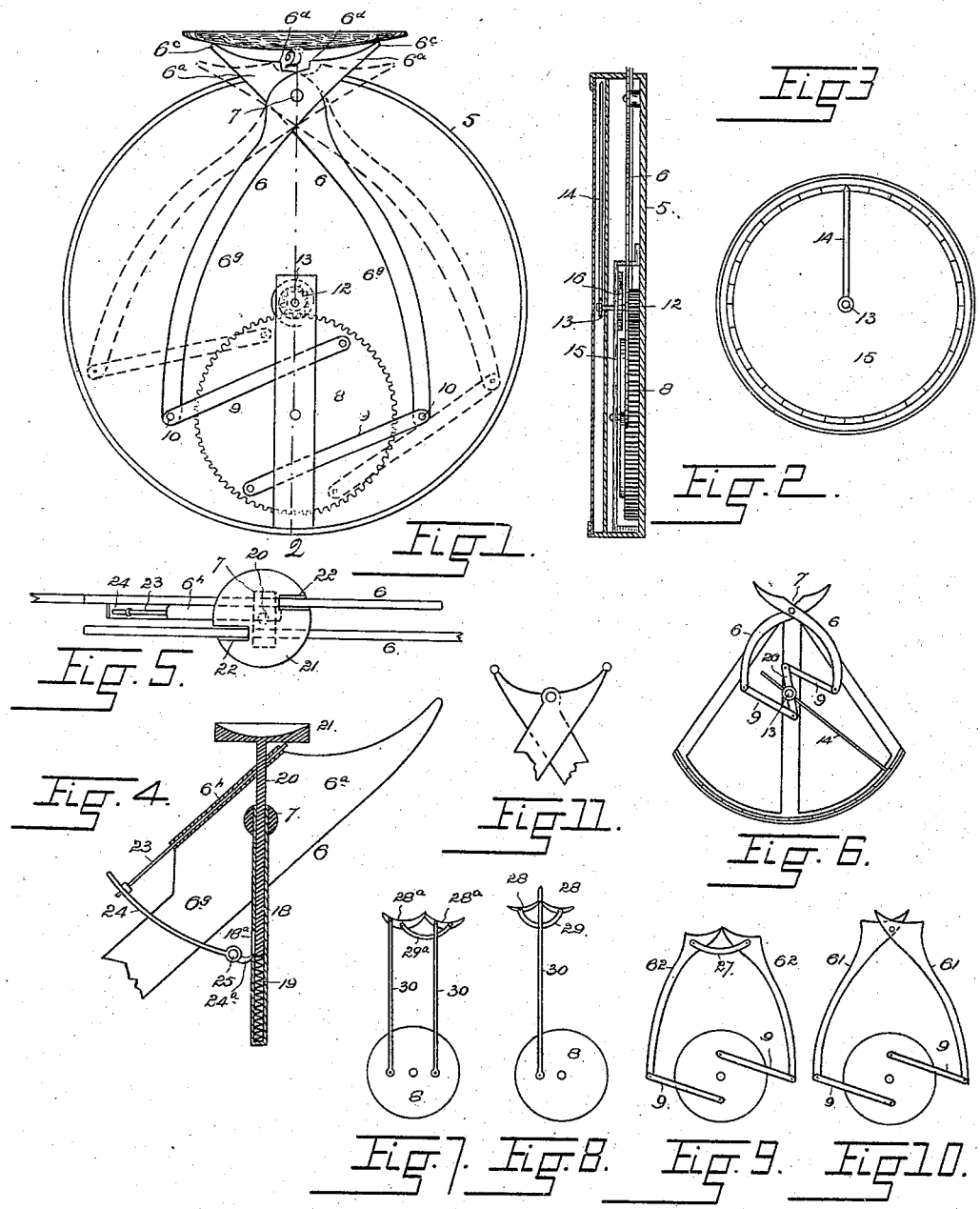

ROBERT H. BIEGEL, OF DENVER, COLORADO.

LENS-MEASURING INSTRUMENT.

SPECIFICATION forming part of Letters Patent No. 532,135, dated January 8, 1895.

Application filed February 3, 1894. Serial No. 499,044. (No model.)

*To all whom it may concern:*

Be it known that I, ROBERT H. BIEGEL, a citizen of the United States of America, residing at Denver, in the county of Arapahoe and State of Colorado, have invented certain new and useful Improvements in Lens-Measuring Instruments; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in instruments for measuring lenses, whereby their curves, and consequent refracting powers, are ascertained.

My object is to provide a device of this class which shall be reliable, durable and accurate, and capable of use without the exercise of special skill.

To this end, my improved lens measure consists of the features hereinafter described and claimed, all of which will be fully understood by reference to the accompanying drawings, in which is illustrated an embodiment thereof.

In the drawings, Figure 1 illustrates the device on an enlarged scale, the front or dial plate being removed, and a lens being shown in place. Fig. 2 is a section taken through the instrument on the line 2—2, Fig. 1. Fig. 3 is a front elevation of the instrument shown on a normal scale. Fig. 4 illustrates a detail of construction designed to prevent the indicating mechanism from varying through the tipping of the lens. Fig. 5 is a top or plan view illustrating the same feature. Figs. 6, 7, 8, 9, 10 and 11 illustrate modified forms of construction.

Similar reference characters indicating corresponding parts or elements of the mechanism in the several views, let the numeral 5 designate a case in which are pivoted two levers 6 on a fulcrum 7. The shorter arms $6^a$ of these levers protrude through the slotted rim of the case, and their faces are curved so that only two points $6^c$ and $6^d$ would engage a plane surface pressed on the face of either arm. The points $6^d$ of the two levers lie in a lower plane.

The surface of the lens to be measured is placed upon the two points $6^c$ and pressed until the points $6^d$ are raised to engagement with the lens surface. An arc drawn through these four points of contact will indicate the curvature of the contact surface of the lens, whether it be convex or concave. This curvature is indicated by mechanism actuated by the movement of the longer arms $6^g$ of the levers, which arms are respectively connected with a gear 8 by bars 9 whose outer extremities are pivoted to the levers as shown at 10, while their inner extremities are pivoted to the gear in such a manner that the outward movement of the longer arms incident to the pressure of the lens upon the shorter arms, will act in unison to actuate the gear 8 which engages a small pinion 12 made fast to a post 13 and carrying a pointer 14 adapted to move over the dial 15 which may be graduated to indicate the curve or refracting power of the lens, either in dioptrics or inches, or both, whereby either system of reading may be employed. The post is surrounded by a coil-spring 16 which is attached thereto at one extremity, and to a suitable stationary support at the opposite extremity. The pivot 7 forming the fulcrum for the levers 6 is apertured to receive a tube 18 which is made fast thereon and located between the two levers. In this tube, whose lower extremity is closed, is located a coil-spring 19 whose upper extremity is engaged by a stem 20 which is passed into the tube 18 and through the pivot 7. To the upper extremity of this stem is made fast a concave disk 21 which is slotted as shown at 22 to receive the adjacent edges of the levers. Upon the edge of one lever is formed a tube $6^h$ in which is located a pin 23 connected with a lever 24, its shorter arm $24^a$ being adapted to enter a slot $18^a$ formed in the tube 18. The pin 23 protrudes slightly above the upper extremity of the tube $6^h$ and engages the surface of the lens just before the point $6^d$ of the lever touches this face, whereby the pin is slightly depressed and the stem 20 locked from downward movement by the engagement of the short arm $24^a$ of the lever 24. Hence, every way the lens may be tipped or inclined, it will come in contact with the disk 21, and this being locked from movement, the levers cannot be moved, and consequently, the indicating mechanism will not vary.

In Fig. 6 the arms 9 are connected with the opposite extremities of a bar 26 pivoted on the post 13 to which the pointer is attached. In this case, the hand will only travel over a segment of a circular dial plate, and must be graduated accordingly.

In Fig. 10, the levers are designated by the reference character 6'; and are so shaped that the inner points of the crescent-shaped faces engage the lens surface first, the surface being forced in this case, until the outer points are brought to contact.

In Fig. 9, the levers are designated as $6^2$ and are pivoted at two separate points on a stationary bar 27, the inner extremity being located in close proximity, and adapted to touch the lens surface first.

In Fig. 8, a straight rod 30 is employed, on which are formed sockets for the reception of the inner points of two crescents 28 which are pivoted to a stationary post 29, the lower extremity of the rod being pivoted on the gear 8, and adapted to give the same a partial rotation as the rod is forced downward. The upper extremity of this rod projects above the crescents and is first engaged by the lens surface. This pin is pressed downward until the outer points of the crescents are brought to engagement with the lens.

In Fig. 7, two rods 30 are pivoted at their lower extremities to the gear 8 at diametrically opposite points, while their upper extremities are pivoted to the crescents $28^a$ which are centrally pivoted to the extremities of a stationary part $29^a$. In using this style of the device, the inner extremities of the crescents engage the lens surface first, the lens being forced down until the outer points are brought to contact. The movement of the rods 30 is in opposite directions, and they therefore act in unison to rotate the gear.

Having thus described my invention, what I claim is—

1. In a lens measuring instrument, the combination with a suitable case, of two movable parts crossed and suitably pivoted together at their point of intersection within the case, and having four contact points in the arc of curvature, substantially as described.

2. In a lens measuring instrument, the combination with a suitable case, of two levers crossed and suitably pivoted together at their point of intersection within the case, their short arms being crescent-faced and protruding therefrom, and suitable indicating mechanism with which the long arms of the levers are connected, substantially as described.

3. In a lens measuring instrument, the combination with a suitable case, of two movable parts crossed and suitably pivoted together at their point of intersection within the case and having protruding extremities adapted to measure the curvature of the lens-surface, substantially as described.

4. In a lens measuring instrument, the combination with a suitable case, two movable parts pivoted in the case, a stationary tube located between the two movable parts and carrying a spring, a stem telescoping within said tube and engaging the spring, said stem being provided with a circular cap slotted to receive the pivoted parts, a movable rod attached to one of the pivoted parts, and a lever having an arm engaging the telescoping stem, substantially as and for the purpose set forth.

In testimony whereof I affix my signature in the presence of two witnesses.

ROBERT H. BIEGEL.

Witnesses:
BRINTON GREGORY,
CHAS. E. DAWSON.